United States Patent
Davis et al.

(10) Patent No.: US 6,381,343 B1
(45) Date of Patent: Apr. 30, 2002

(54) REMOTE PRINT PRESS PROOFING SYSTEM

(75) Inventors: Kevin P. Davis; D. Jack Gaido, Jr., both of Simpsonville, SC (US); Franz H. Herbert, Encinatas, CA (US)

(73) Assignee: Lotsadots, Inc., Greenville, SC (US)

( * ) Notice: Subject to any disclaimer, the term of this patent is extended or adjusted under 35 U.S.C. 154(b) by 0 days.

(21) Appl. No.: 09/726,922

(22) Filed: Nov. 30, 2000

Related U.S. Application Data

(60) Provisional application No. 60/195,688, filed on Apr. 7, 2000.

(51) Int. Cl.[7] .................................................. G06K 9/00
(52) U.S. Cl. ....................................................... 382/112
(58) Field of Search ................................ 382/112, 162, 382/167, 232, 255; 358/1.6, 500, 501, 504, 400, 401, 405, 406, 434, 435, 436, 442, 443, 448; 348/177, 178, 179; 345/431, 150, 153, 154, 329, 330, 335, 186, 510, 62, 11, 22, 27, 33, 55; 379/88.07, 88.13, 88.14, 88.17, 93.06, 93.08, 204, 404

(56) References Cited

U.S. PATENT DOCUMENTS

| | | | | |
|---|---|---|---|---|
| 4,561,103 A | | 12/1985 | Horiguchi et al. ........... 382/112 |
| 5,333,069 A | * | 7/1994 | Spence ........................ 358/517 |
| 5,384,859 A | | 1/1995 | Bolza-Schunemann et al. .. 382/112 |
| 5,625,766 A | | 4/1997 | Kauffman .................... 345/435 |
| 5,652,849 A | | 7/1997 | Conway et al. ............. 345/327 |
| 5,689,642 A | * | 11/1997 | Harkins et al. ............. 709/207 |
| 5,721,811 A | | 2/1998 | Eckhardt et al. ............. 358/1.9 |
| 5,767,980 A | | 6/1998 | Wang et al. ................ 358/298 |
| 5,799,219 A | | 8/1998 | Moghadam et al. ......... 396/319 |
| 5,864,387 A | | 1/1999 | Reed et al. ................... 355/40 |
| 5,874,988 A | * | 2/1999 | Gu ............................... 348/97 |
| 5,910,796 A | * | 6/1999 | Gormish ..................... 345/153 |
| 5,983,369 A | * | 11/1999 | Bakoglu et al. .............. 714/46 |
| 5,991,276 A | * | 11/1999 | Yamamoto .................. 370/260 |
| 6,014,183 A | | 1/2000 | Hoang ........................ 348/702 |
| 6,017,157 A | | 1/2000 | Garfinkle et al. ........... 396/639 |
| 6,076,166 A | * | 6/2000 | Moshfeghi et al. ......... 713/201 |
| 6,091,518 A | * | 7/2000 | Anabuki ..................... 358/500 |
| 6,157,735 A | * | 12/2000 | Holub ........................ 382/167 |
| 6,223,183 B1 | * | 4/2001 | Smith et al. ................ 707/102 |
| 6,246,797 B1 | * | 6/2001 | Castor et al. ............... 382/232 |

* cited by examiner

*Primary Examiner*—Andrew W. Johns
*Assistant Examiner*—Shervin Nakhjavan
(74) *Attorney, Agent, or Firm*—McNair Law Firm, P.A.; Douglas W. Kim; Cort Flint

(57) ABSTRACT

This invention is directed to a remote press proofing system having the camera or cameras for digitizing the image of a press proof, for example, transmitting the digital image to a printer's terminal, color correcting the digital image, transmitting the image to a client's site also having a color correct monitor, so that the client may be view a color corrected digital image of a physical press proof sheet in order to approve whether the quality and color of the sample is sufficient without having to physically travel to the printer's location.

29 Claims, 4 Drawing Sheets

REMOTE PRINT PRESS PROOFING SYSTEM

The application claims priority on co-pending application Ser. No. 60/195,688 filed on Apr. 7, 2000 incorporated by reference.

FIELD OF THE INVENTION

This invention is directed to a computerized press proofing system for printing and, more particularly, to a computer system having the ability to transmit a color managed image from an originating location to a remote location so that a remote viewer can view a color correct digital representation of a press proof.

BACKGROUND OF THE INVENTION

In the printing industry, it is common for a press check to be conducted to ensure that the print run meets the specifications of the client. The purpose of a press check is to ensure that the color, type, and other appearances are satisfactory to the client. This process is very important since printing runs can be in excess of 100,000 copies. Considerable time, effort, and money is wasted if a print run of a large number of copies is made and the client subsequently rejects the quality of the copies. Traditionally, the client physically travels to the printer's location in order to perform a press check. This requires that the client spend time and money, as well as, requires the client and the printer to coordinate the session so that neither party will wait on the other. When a print job necessitates multiple runs, the print check process is performed prior to each run requiring a waiting period between press checks. Since a run of 40,000 copies may require hours, the client must wait for the run to be completed before the client is able to perform a press check on a second run. Since most clients are designers whose time is at a premium, there are significant inefficiencies in the present system that much attention should be directed.

Accordingly, the present invention provides a proofing system that alleviates the need for the client to physically travel to the printer's location.

The present invention also provides a press proofing system that allows the client to view a color corrected digital image representing a press sheet from the convenience of the client's location.

The present invention also provides a remote press proof system that can record and store a press check session to record the comments and ultimate sign off of the press check.

The present invention also provides a remote press proof system that allows for the efficient transmission of images representing multiple magnifications to the client.

SUMMARY OF THE INVENTION

The present invention provides for a virtual press proofing system allowing a color managed digital image of a press proof digitized at a printer's site to be transmitted to a viewer's computer located at a remote site having an image server with a computer readable medium, a network connecting the image server to the remote site having at least one processor contained within the image server and connected to the computer readable medium, a digitizing device such as a scanner, digital camera, or digital scanback for a camera to capture a digital image of a physical sample, and color profile information of the digitizing device representing the physical characteristics of the digital device. A computer program resides on the image server containing instructions executable by the processor for receiving the color profile, receiving digital information from the digitizing device, adjusting said digital information based upon the color profile, formatting the digital information into a plurality of layers of differing resolutions, and displaying a digital image at the image server. This allows for only a specific layer to be transmitted responsive to a requested magnification of the digital image data to quickly and efficiently display to the viewer a virtual press proof. Additionally, each layer can be broken down into tiles to further refine the ability to quickly and efficiently transmit the least amount of data for each requested magnification. Both layers and tiles can be stored in a compressed format and decompressed by the image server or remote computer prior to viewing the digital image.

In order to provide consistency between the digital images viewed by the printer and the client, the monitors at the printer's site or image server site and the remote site are color-calibrated to be color-matched within a proscribed tolerance.

Additionally, the software allows for the manipulation of the digital information so that the displayed digital image can be changed to both view proposed changes to the image such as color, hue, brightness and other characteristics as well as to emulate what the physical changes to the printing press may do to the physical sample or press proof subsequently created. Printing press profile information is used to adjust or manipulate the digital information to provide a virtual printing press change.

In order to facilitate the press checking session, audio and video data can be transmitted to and from the printers site and the client's site to provide for a virtual conference to discuss the session. This audio and video information can also be recorded along with the changes to the virtual proof for later review.

In operation of this invention the software and hardware are integrated to provide for calibrating the image server monitor based upon a color profile of the monitor, receiving a color profile of the digitizing device containing calibration information of the digitizing device, receiving digital image information from the digitizing device representing the physical sample, adjusting the digital image based upon the color profile of the digitizing device, formatting digital image information in a plurality of layers representing a plurality of resolutions, and transmitting digital image information to the remote computer and remote monitor so that a digital image displayed from the digital image information on the image server monitor is color matched within a proscribed tolerance of the digital image displayed on the remote monitor. The system can also perform the steps of receiving an image request signal from the remote computer containing resolution information; transmitting a specific layer responsive to the requested resolution so that the amount of data transmitted is only that necessary for the requested resolution, or transmit a tile, or portion of a tile instead of an entire layer. Additionally, the invention provides for capturing video information on the image server through a video camera connected to the image server, transmitting the video information over the network to the remote computer for display of video at the remote computer's site, capturing audio information on the image server through a microphone connected to the image server, and transmitting the audio information over the network to the remote computer for providing an audio signal which can be heard at the remote computer's site.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
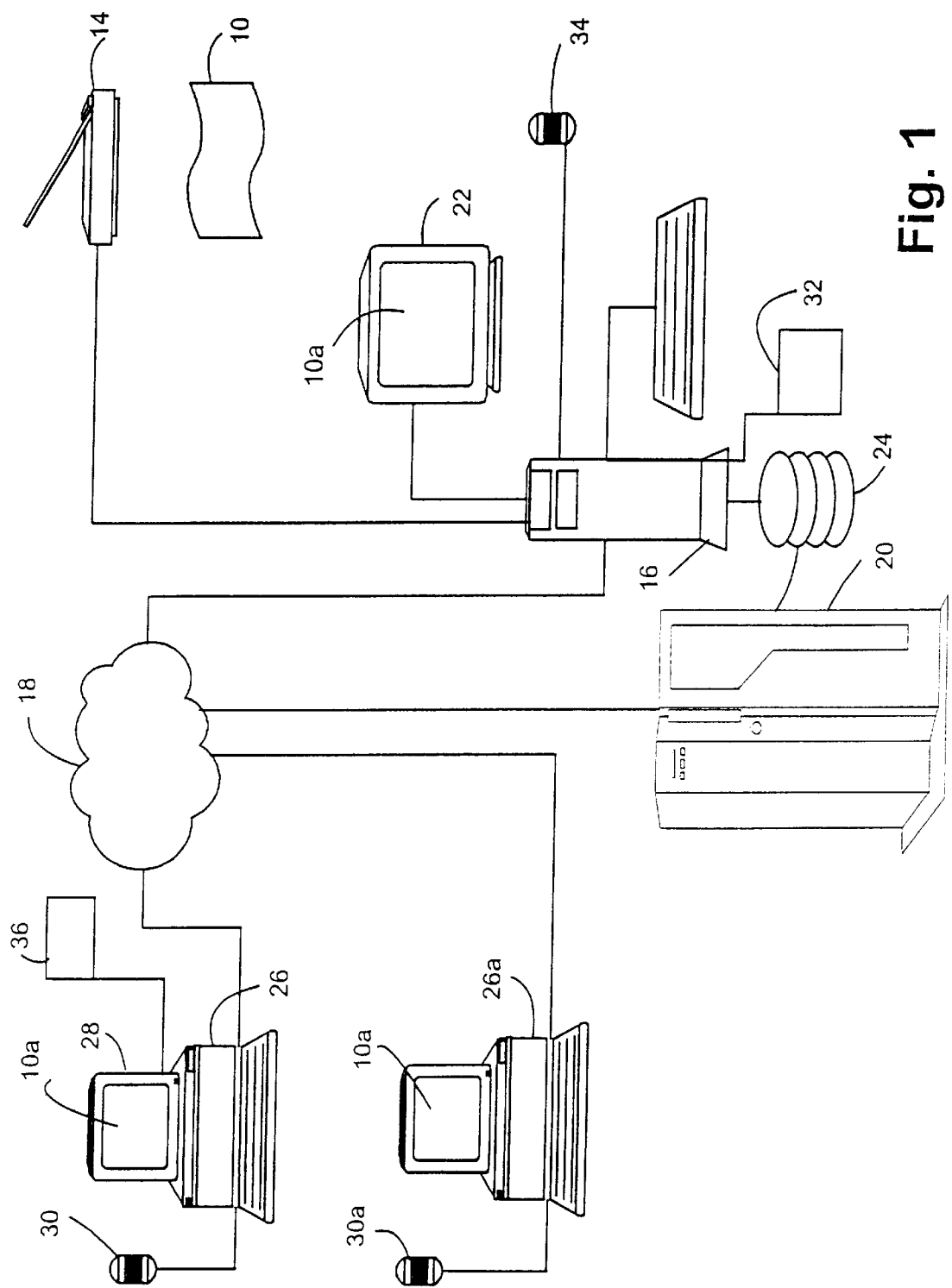
FIG. 1 illustrates a schematic of the press check system connected to a network.

Referring now in more detail to the drawings, the invention will be described in more detail. In FIG. 1, a physical sample 10 is digitized by a digitizing device 14 which can be a scanner, camera, camera scan back, or other digitizer, is connected to an image server 16 for creating digital image information representing a physical sample. Once images created or captured, they can be either stored on the image server 16 or sent through a network 18 to a host 20. Additionally, the computer represented as 16 in FIG. 1 may merely be a terminal for accessing an image server that could be represented as 20 in an alternative embodiment. Regardless of the physical representation of the image server, software on the image server and color-calibrated monitor 22 allow a digital image 10a to be displayed based upon captured digital information representations sample 10 so that the displayed image and the physical sample appear alike within prescribed tolerances.

Software included within the computer readable medium of the image server is capable of receiving a color profile associated with the digitizing device to assist in manipulating the digital information displayed so that an as near as possible color correct digital image is provided. Prior to digitizing the physical sample, such as a press proof sheet, the digitizing device is profiled so that the image server is aware of the specific color characteristics of the digitizing device. The goal is to reduce or eliminate colorcast and other imperfections that may be included in the digital information derived from the digitizing device. Color profiling can be derived from specifications by the International Color Consortium (ICC) in its profile format. This format provides a cross platform device profile format used to translate color data created by one device into another device's native color space. Hardware and software using this profile has the ability to create profiles as defined by the ICC standard. ICC conforming software can be used to satisfy the ICC requirements. Further information can be found from the ICC.1: 1998-09 specification for file format for color profiles. Those skilled in the art would incorporate these profiles into software to provide color profiles for various hardware.

A client wishing to utilize this system can access image server 16 through a remote or client computer 26 that is also connected to network 18. A color-calibrated monitor 28 is also connected to the client computer. The client is able to retrieve digital information representing the physical sample and have a digital image 10a displayed on client monitor 28. Since image server monitor 22 and client monitor 28 are color calibrated, the client is able to see the same color correct image of sample 10 at the client monitor as at the image server monitor within prescribed tolerances. Once the image is retrieved, the client may wish to communicate with the printer by speaking into a client microphone 30 so that voice data can be transmitted through network 18 to at least on printer speaker 32 located on image server 16. The printer can respond to the client's comments through microphone 34 which captures audio information for transmission through network 18 to at least one client speaker 36. Since digital image information 10a is stored in a database 24 included with local digital image server 16 or central image server 20, multiple client sites can retrieve digital image information for viewing the same digital image at the same time. For example, a client using client computer 26a may also view digital image 10a as well as provide comments or request corrections to the image viewed through a second 's microphone 30a. By having each monitor color calibrated, the image integrity and color matching can be within a prescribed tolerance between clients and printers to provide for a virtual print proofing session.

Figure 2:
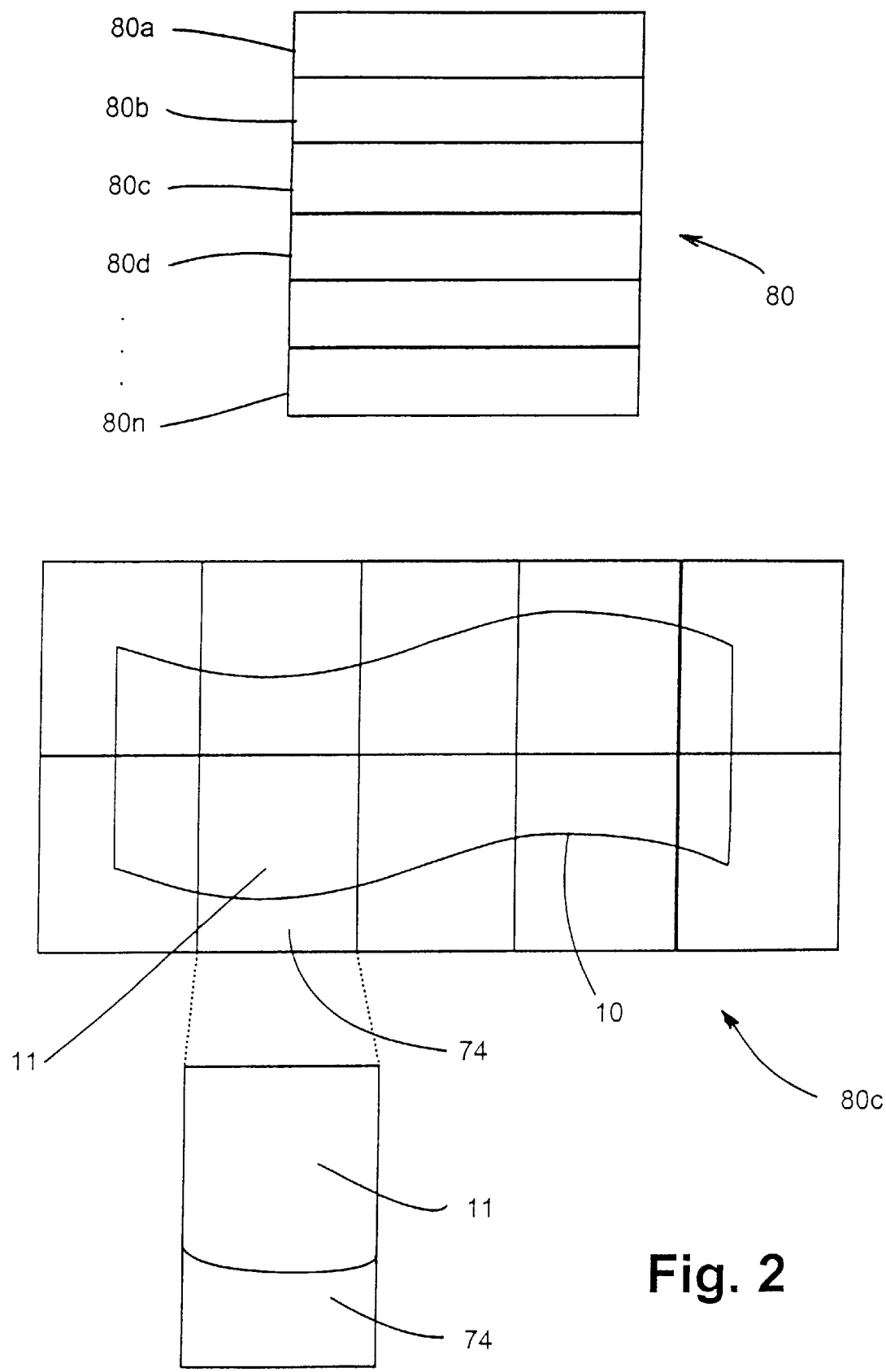
FIG. 2 illustrates a flow diagram of the steps and data transmitted between the printer and the client.

During a print proofing session, the client may wish for different areas of the sample to be viewed and/or zoomed in and out by requesting various magnifications to specific areas of the digital image. This allows the client to inspect and comment upon particular areas of the digital image and ultimately the physical sample. Therefore, it is advantageous to format the digital information initially captured into multiple layers within a computer readable file with each layer representing a different resolution of the digital image. Additionally, each layer can be comprised of at least one tile that represent a portion of the digital information representing a portion of the physical sample. This format allows for the transmission of digital image data of high resolution across a network without significant bandwidth requirements since a typical press proof is approximately 28" by 40" in dimension. Referring now to FIG. 2, a diagram illustrating a typical file format 80 is further shown. An initial section 80a contains file identification information such as header information and characteristics of the file including number of layers, compression rates, tile size, and other such administrative information. Layer 80b can include "raw" image information that is uncompressed so that the relationship between the pixel represented in the layer and the pixels of the image is 1 to 1. This layer is typically coined layer zero and is one-hundred percent resolution. Layer 80c can then have a more compressed representation of the physical sample. For example, the pixels of this layer may represent two pixels of layer zero providing for a more compressed representation of the physical sample. A Layer N illustrated as 80n ,ay contain sufficient compression as to allow for the entire physical image to be 20 displayed on the available pixels of a viewing screen. It should be noted that generally, layer zero is of a size that display on a typical viewing screen of the entire physical sample representation is not possible. By dividing the layers into tiles, increased efficiency is obtained through transmission between the stored image information to a viewing screen in that the information can be transmitted tile by tile rather than the entire image at a time. Therefore, when a client selects a specific magnification and wishes to see sample portion 11 with this magnification, the digital information contained in tile 74 is sent from the image server to the client's computer without having to transmit the entire file. As such, the significantly reductions are achieved in the amount of data transmitted, the amount of bandwidth required, and the transmission time needed for displaying the sample portion 11 on the client's or image server's monitor. The physical manipulation and resulting advantages for managing tiles are contained within computer readable code on the image server and provide for a layer and tile manager set of computer readable instruction.

Figure 3:
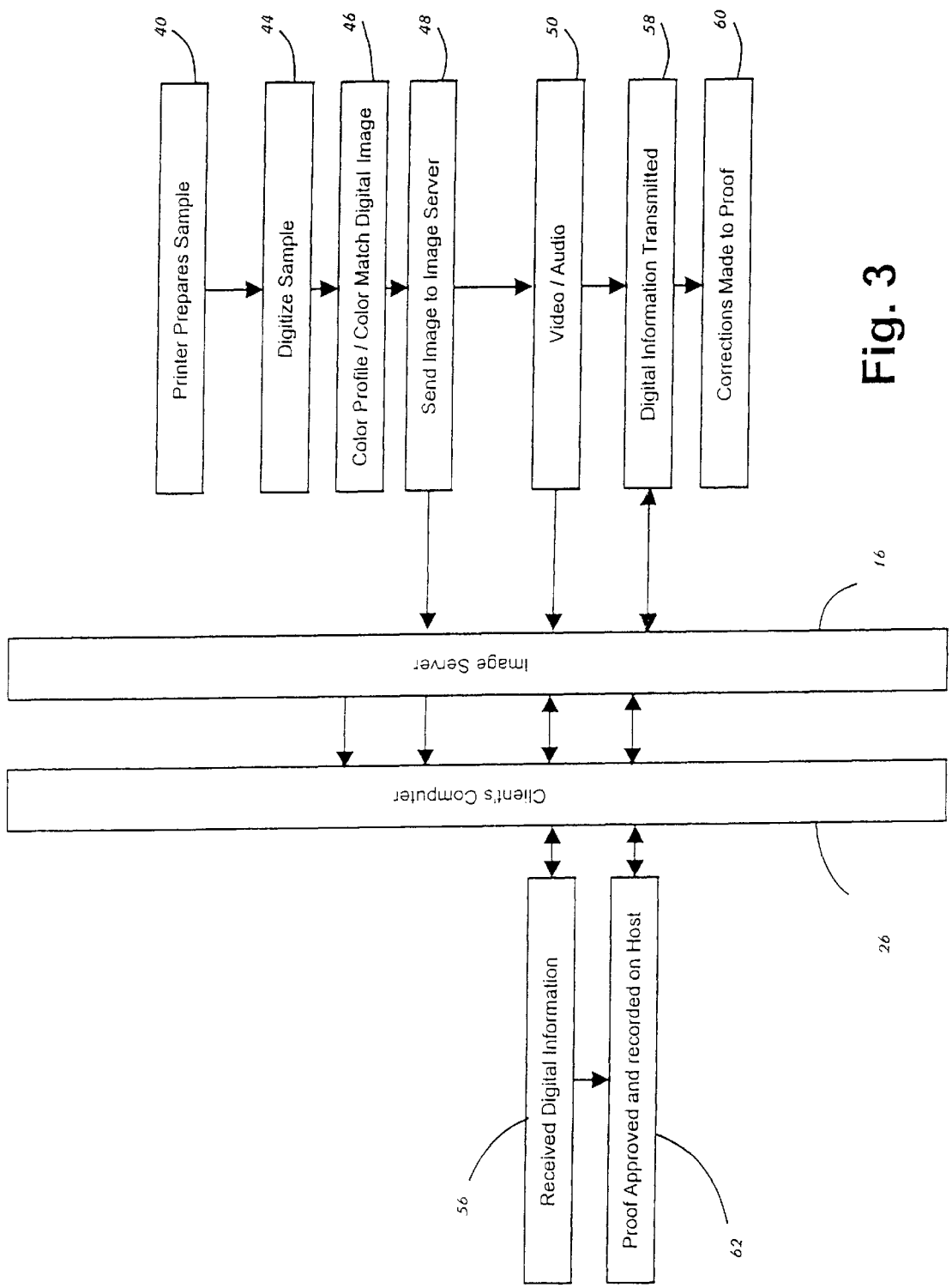
FIG. 3 shows data signal transmission between the printer and the client.

Referring now to FIG. 3, the steps taken during a press proofing session is further illustrated. The first step in this process is where the printer prepares the sample of the press proof in step 40. Next, the sample is digitized for producing digital information representing a still image of the sample using digitizing device 14 in step 44. The image is then color matched using software, color profiling of the digitizing device, and environmental readings through image server 16 so a digital image displayed on the image server is color matched within a prescribed tolerance of the physical sample in step 46. The digital information image may then be sent to central image server 20 when the specific embodiment requires the image server physically separated from the printers' terminal in step 48. When video information or audio information is captured for transmission to the remote site, the transmission is initiated in step 50. In step 58, the client is provided with digital information representing the physical sample for display of a digital image. The client receives the digital information and can display the digital image from this information in step 56. When the client requests a change to the digital image, the printer can manipulate the digital information for redisplay in step 60. At some point the client may approve the proof and this approval is recorded in step 62. The recordation of approval is available for future review to the image server.

Figure 4:
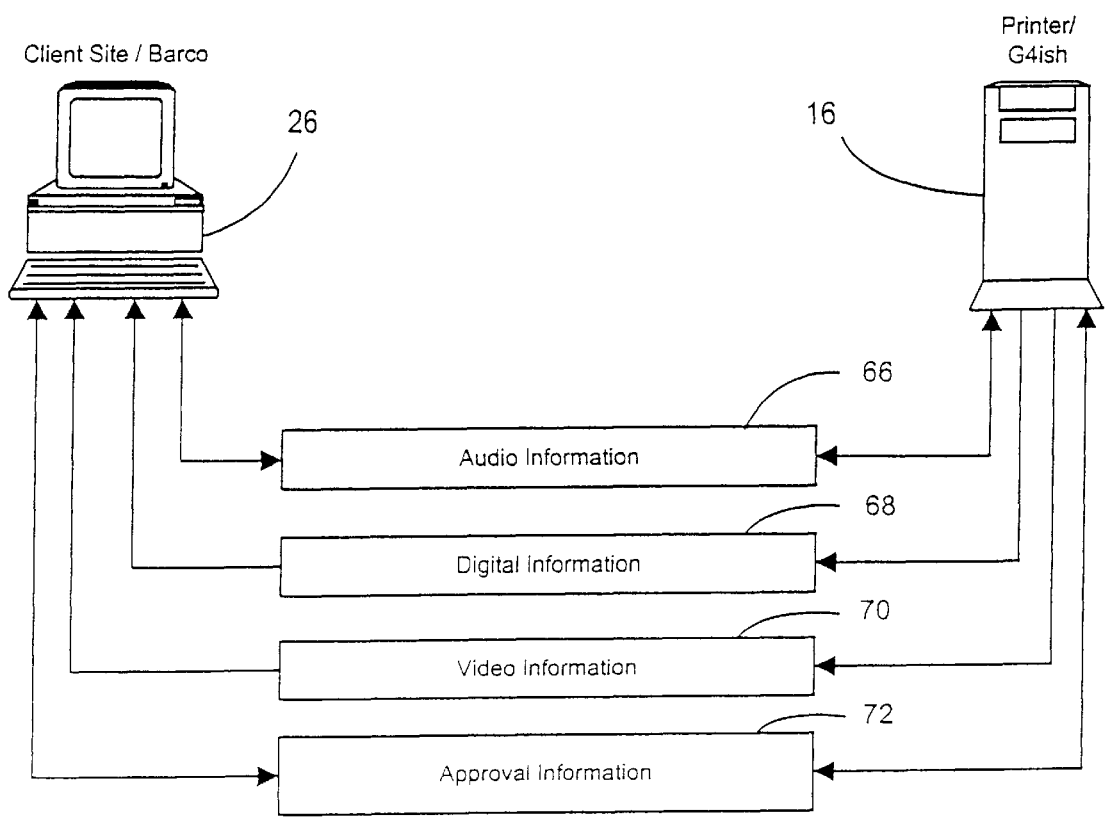
FIG. 4 shows a file format of storing digital images.

Referring now to FIG. 4, the image server can be further illustrated. In one embodiment of this system, it is advantageous to record the session between the printer and the client in order to preserve the interaction between the parties and especially to have a record of the contemplated changes to the press proof. Therefore, the image server or central host have the ability to capture the data transmissions between the printer and the client for storing audio information 66 between the printer's and client's terminal, the digital information 68 including changes to the digital images, video conferencing information 70 between the printer and the client, and approval information form the client 72. This information can be recorded, copied to a transportable medium, archived, sent to the client, or sent to the printer. As well as the above stored information, the system can track other characteristics of the session for such purposes as accounting. For example, the time elapsed during the press proof session, the amount of data transmitted from the printers to the clients, the number of still images transmitted, and the number of clients connected to a printer. Such information is advantageous for invoicing the printer, the client, or both for use of the system.

While a preferred embodiment of the invention has been described using specific terms, such description is for illustrative purposes only. It is to be understood that changes and variations may be made without departing from the spirit or scope of the following claims.

What is claimed is:

1. A virtual press proofing system for providing a color managed digital image of a press proof originating at a printer's site to a viewer's computer located at a remote site comprising:

an image server having a computer readable medium and color calibrated video display;

a network connection for allowing communications between said image server and a network;

at least one processor contained within said image server in communication with said computer readable medium;

a digitizing device in communication with said computer readable medium for creating digital image information representing the hard press proof;

said digitizing device having color profile information specific to said digitizing device;

a set of computer readable instructions contained within said computer readable medium, that when executed by said processor, said set of instructions causes said processor to perform the steps of receiving said color profile information from said digitizing device, receiving the digital information representing the hard press proof from said digitizing device, adjusting said digital information representing the hard press proof responsive to said color profile information, and displaying the digital information representing the hard press proof on said color calibrated video display, and transmitting said adjusted digital information representing the hard press proof responsive to a request from the viewer to view the virtual press proof at a remote location so that said digital information representing the hard press proof is viewable simultaneously at both the printer's site and viewer's site.

2. The system of claim 1 wherein said set of computer instructions includes instructions for formatting said digital information into a plurality of layers of differing resolutions so that each layer can be transmitted based upon the viewer's requested magnification to efficiently and quickly allow the viewer to view the virtual press proof without a degredation in image quality.

3. The system of claim 2 wherein said set of computer readable instructions includes compression instruction for compressing said digital information within at least one of said layers so that storage of said layers requires less space within said computer readable medium.

4. The system of claim 2 wherein each layer contains at least one tile so that a portion of said digital information representing the hard perss proof can be displayed at varying viewing sizes without reducing image quality.

5. The system of claim 1 wherein said network is the Internet.

6. The system of claim 1 wherein said set of computer readable instructions include manipulation instructions for manipulating said digital information representing the hard press proof, responsive to the user of said image server, so that changes to said digital information representing the hard press proof resulting from the manipulation can be displayed.

7. The system of claim 6 wherein:

said set of computer readable instructions include receiving instructions for receiving printing press color profile information; and, said manipulation instructions include instructions for adjusting the changes to said digital information representing the hard press proof, responsive to the user and the printing press color profile information, so that changes to said digital information emulates changes to the press proof were changes to be made to the printing press.

8. The system of claim 1 including:

a video camera connected to said image server; and, a set of video instructions contained within said computer readable medium so that when said processor executes said instructions, a video image is captured by said video camera for transmission to the remote site.

9. The system of claim 8 wherein said video instructions include instructions for storing said video image within said computer readable medium.

10. The system of claim 1 including:
a microphone connected to said image server; and,
a set of audio instructions contained within said computer readable medium that, when executed by said processor, audio information is captured by said microphone for transmission to the remote site.

11. The system of claim 10 wherein said audio instructions include instructions for storing said audio information within said computer readable medium.

12. A virtual proofing system for providing a color managed digital image of a physical sample originating at an image server site to at least one remote site comprising:
an image server having, a processor, a computer readable medium and connected to a network;
a digitizing device in communication with said computer readable medium for capturing digital information representing the physical sample;
a first color calibrated monitor connected to said image server for displaying a digital image from said digital information;
at least one remote terminal having a computer readable medium connected to said network for transmitting image requests to said image server and receiving responses from said image server;
a second color calibrated monitor connected to said remote computer for allowing the digital images representing physical samples viewed on said first and second monitors to be color matched within a predetermined tolerance;
a set of computer readable image server instructions stored within said computer readable medium of said image server for receiving said digital information representing the physical sample from said digitizing device, displaying said digital image representing at least a portion of the physical sample on said first color calibrated monitor and transmitting at least a portion of said digital information representing the physical sample to the remote site for viewing; and,
a set of computer readable remote instructions stored within said computer readable medium of said remote computer for sending an image request to said image server, receiving at least a portion of said digital information representing the physical sample from at least one layer representing the requested resolution, and displaying a digital image on said second color calibrated monitor based upon said portion of said digital information received so that said displayed image is color matched within a predetermined tolerances of the digital image displayed on said first monitor.

13. The system of claim 12 wherein said set of computer readable image server instructions include instructions for formatting said digital information in a plurality of layers with each layer representing differing resolutions.

14. The system of claim 13 wherein said computer readable image server instructions include storage instructions for storing said plurality of layers on said computer readable medium of said image server received from said digitizing device.

15. The system of claim 14 wherein:
said computer readable image server instructions include instructions for storing said layers in a compressed format and transmitting said digital information in said compressed format; and,
said remote instructions include decompression instructions for decompressing said transmitted digital information in said compressed format.

16. The system of claim 13 wherein each layer contains at least one tile so that a portion of said digital information representing the physical sample can be displayed at varying viewing sizes without reducing image quality.

17. The system of claim 12 wherein said computer readable image server instructions include storage instructions for storing said digital information on said computer readable medium of said image server received from said digitizing device.

18. The system of claim 12 including:
a video camera connected to said image server for capturing video data at the image server site;
a set of video instructions contained in said computer readable medium of said image server for receiving said video data from said video camera and transmitting said video across said network;
a set of remote video instructions embodied in said computer readable medium of said remote computer for receiving said video data over said network from said image server and displaying said video information on said second monitor.

19. The system of claim 18 including a video display connected to said remote computer for displaying said video information received from said image server.

20. The system of claim 12 including:
a microphone connected to said image server for capturing audio information at the image server site;
a set of audio instructions contained in said computer readable medium of said image server for receiving said audio information and transmitting said audio information across said network;
at least one speaker connected to said remote computer for outputting audio information; and,
a set of remote audio instructions contained within said computer readable medium of said remote computer for said receiving said audio data from said image server over said network and outputting said audio data through said at least one speaker.

21. The system of claim 12 wherein said computer readable image server instructions includes manipulation instructions for manipulating said digital information representing the physical sample responsive to the user of said image server so that changes to said digital information representing the physical sample resulting from the manipulation can be displayed at both image saver and at least one of said remote terminals.

22. The system of claim 12 wherein said computer readable remote instructions include manipulation instructions for manipulating said digital information representing the physical sample responsive to the user of said remote terminal so that changes to said digital information representing the physical sample resulting from the manipulation can be displayed at both image and at least one of said remote terminals.

23. The method of providing a color managed digital image from a digitizing device of a physical sample originating at an image server with a image server monitor to a client's remote computer having a remote monitor at a remote site over a network comprising the steps of:
calibrating the image server monitor based upon a color profile of the monitor so that said image server monitor will display a digital image color matched within a prescribed tolerance of a digital image displayed on the remote monitor;
receiving a color profile of the digitizing device containing calibration information of the digitizing device;

receiving digital image information representing the physical sample from said digitizing device representing the physical sample;

adjusting said digital image based upon said color profile of said digitizing device; and, transmitting said digital image information to said remote computer and remote monitor so that a digital image displayed from said digital image information on said image server monitor is color matched within a proscribed tolerance of the digital image displayed on the remote monitor.

24. The method of claim 23 including formatting said digital image information in a plurality of layers representing a plurality of resolutions.

25. The method of claim 24 including receiving an image request signal from the remote computer containing resolution information; transmitting a specific layer responsive to said requested resolution so that the amount of data transmitted is only that necessary for the requested resolution.

26. The method of claim 24 including formatting said digital image information in a plurality of layers representing a plurality of resolutions with each layer being comprised of at least one tile.

27. The method of claim 26 including receiving:

an image request signal from the remote computer containing resolution information, and transmitting a specific tile responsive to said requested resolution so that the amount of data transmitted is only that necessary for the requested resolution.

28. The method of claim 23 including:

capturing video information on said image server through a video camera connected to the image server; and, transmitting said video information over the network to the remote computer for display of video at the remote computer's site.

29. The method of claim 23 including:

capturing audio information on said image server through a microphone connected to said image server; and, transmitting said audio information over the network to the remote computer for providing an audio signal which can he heard at the remote computer's site.

* * * * *